No. 896,980. PATENTED AUG. 25, 1908.
S. FERGUSON.
RECTIFIER PANEL.
APPLICATION FILED SEPT. 18, 1905. RENEWED FEB. 26, 1908.
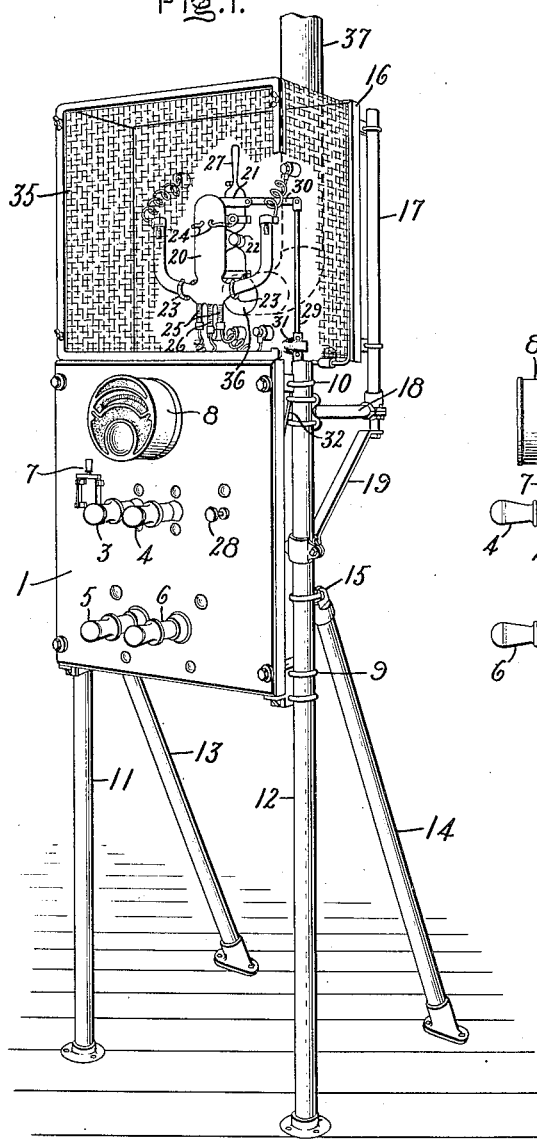
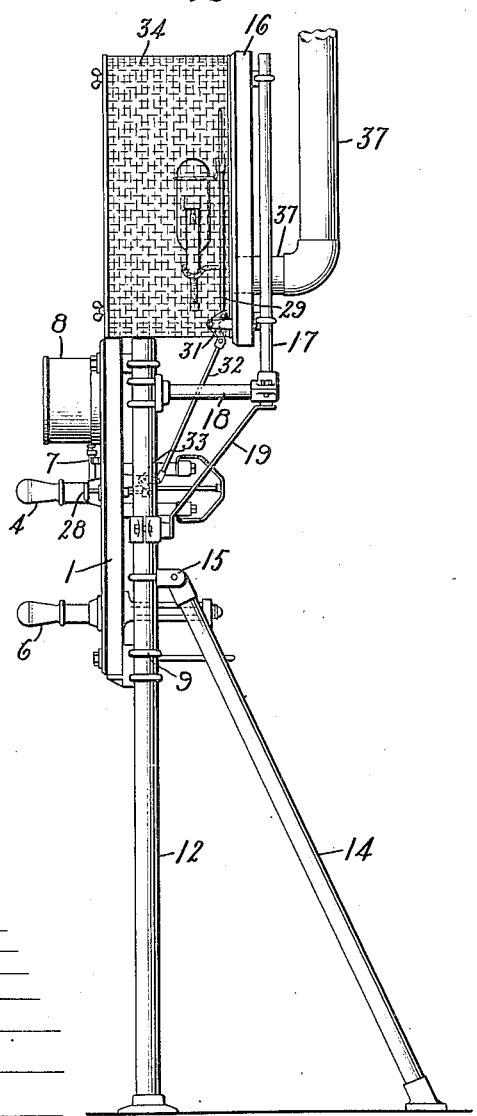
WITNESSES:
George W. Tilden
Helen Orford
INVENTOR:
Samuel Ferguson,
By Albert G. Davis
Att'y.

UNITED STATES PATENT OFFICE.

SAMUEL FERGUSON, OF SCHENECTADY, NEW YORK, ASSIGNOR TO GENERAL ELECTRIC COMPANY, A CORPORATION OF NEW YORK.

RECTIFIER-PANEL.

No. 896,980.       Specification of Letters Patent.       Patented Aug. 25, 1908.

Application filed September 18, 1905, Serial No. 278,862. Renewed February 26, 1908. Serial No. 417,860.

*To all whom it may concern:*

Be it known that I, SAMUEL FERGUSON, a citizen of the United States, residing at Schenectady, county of Schenectady, and State of New York, have invented certain new and useful Improvements in Rectifier-Panels, of which the following is a specification.

The invention hereinafter set forth relates to rectifier apparatus for changing alternating current into direct current, and more particularly to that type of rectifier in which the operation is performed by means of a rectifying arc in a vacuum.

The invention comprises more especially means for mounting a rectifier with its co-operating switches, measuring instruments, etc. The invention is, moreover, intended to provide especially for the mounting of rectifiers for high voltage alternating current, as for example those rectifiers used for rectifying the current supplied from a high voltage constant current system. Owing to the dangerous character of the voltages employed in such systems, which voltages vary anywhere from 10,000 volts to 30,000 volts or more, it is necessary that those parts of the apparatus which are submitted to these high potentials should be well protected so as to minimize as far as possible the danger incurred by the operator in handling the apparatus.

To this end, my invention embodies certain arrangements of apparatus and details of construction the novel features of which are pointed out with particularity in the appended claims.

The invention itself, however, will be better understood by reference to the following description taken in connection with the accompanying drawings, in which:—

Figure 1 is a perspective view of an apparatus embodying my invention; and Fig. 2 a side elevation of the same.

Roughly speaking, the apparatus shown in Fig. 1 comprises, first a switchboard panel, and, mounted flush with this panel, a cage or inclosure for the rectifier proper. Thus, in Fig. 1, the switchboard is indicated at 1 and may consist of a slab of marble, slate, or the like. This panel carries plug switches 3, 4, 5 and 6 for controlling the high voltage circuits of the rectifier, and a small low-voltage two-pole switch 7 for controlling starting circuits of the rectifier. The particular arrangements of connections of the rectifier form no portion of the present invention and, therefore, it is unnecessary to point out the circuit connections, as these are now well understood by those familiar with the art. Current-measuring instruments, such as 8, may also be mounted on the panel.

The panel itself is supported from clamps such as 9 and 10 fastened to upright standards 11 and 12, the lower ends of which rest upon the floor or other foundation. To preserve the standards and parts carried thereby in an upright position, braces such as 13 and 14 are fastened at their lower ends to the flooring and at their upper ends are pivoted to the corresponding standards, as for example at 15.

The rectifier support proper consists of a supplementary panel or slab 16 of marble or the like carried by uprights such as 17, fastened to brackets 18, having supporting braces such as 19.

Upon the panel 16, the rectifier itself is mounted. This rectifier is indicated at 20 and may, of course, be of any suitable construction. Inasmuch as the particular construction of the rectifier tube forms no portion of the present invention no special description of the same is necessary. The tube itself is mounted upon a carrier 21, pivoted at 22, and having arms 23 and 24, which embrace parts of the rectifier and hold the same in position. The rectifier is started by tilting it about its pivot 22 so as to cause the mercury of one or other of the two outside electrodes 25 of the rectifier to make momentary contact with the mercury of the middle electrode 26. These outside electrodes 25 are in the starting circuit of the rectifier and it is this circuit which is controlled by the switch 7 on the switch panel.

It is, of course, possible to start the rectifier by manually tilting the same by means of a handle such as 27. Owing, however, to the dangerously high voltages employed with the apparatus, this is not ordinarily a safe operation to perform and, therefore, I connect the pivoted rectifier by a system of articulated connections to an operating handle 28 on the switch panel 1. Thus, the link 29, preferably of wood or other insulating material, is pivoted at one end to a rod 30, rigidly fastened to the rectifier-carrying frame 21 and at its other end to the bell-crank 31. Another wooden link 32 joins the bell-crank 31 to a second bell-crank indicated in dotted lines at 33, to which latter bell-crank a longitudinally movable rod with operating handle 28 is fixed. By pulling on this handle, the rectifier is caused to tilt so as to cause the desired flow or agitation of mercury between the electrodes in the lower portion thereof and thereby to start up the rectifier in a manner well understood in the art and not necessary here to describe.

The rectifier proper, by means of the apparatus described, being free from the necessity of manual contact therewith, is inclosed in a wire cage 34, fixed at its rear end to the panel 16 and closed at its front end by a removable screen wire cover 35 flush with the panel 1. In order the better to exhibit the rectifier the cage is shown partly broken away in the drawings. This wire cage prevents mechanical injury to the apparatus and forms at the same time a safe-guard against the dangerously high potentials present in the apparatus during operation.

With the particular type of rectifier shown, it is desirable in order to prevent arcing between the anodes that the region of the rectifier tube immediately about the mercury electrode should be subjected to some cooling means such as a blast of air, while the anodes themselves should be allowed to run hot. An opening, 36, is, therefore, formed in the panel 16 immediately in the rear of that portion of the rectifier to be cooled, and into this opening fits a pipe 37 through which a blast of air from a blower or fan is directed. This construction protects the anodes from the cooling blast while it allows the region about the cathode to be cooled.

What I claim as new, and desire to secure by Letters Patent of the United States, is,—

1. The combination of a panel board carrying switches and the like, standards for supporting said board, a second panel board, brackets connected to said standards for supporting said second panel board in a position above and behind the first panel board, and a vapor electric device carried by said second panel board.

2. The combination of a panel board carrying switches and the like, standards for supporting said board, a second panel board, brackets connected to said standard for supporting said second panel board in a position above and behind the first panel board, a vapor electric device carried by said second panel board, and a protecting cage inclosing said vapor electric device and having its front surface practically flush with the first mentioned panel board.

3. The combination of a panel board carrying switches and the like, standards for supporting said board, a second panel board, brackets connected to said standard for supporting said second panel board in a position above and behind the first panel board, a vapor electric device carried by said second panel board, and a protecting cage inclosing said vapor electric device.

4. The combination of a panel board, supporting means therefor, a vapor electric device carried by said panel board, an opening in said panel board opposite a portion of said device, and an air blast tube communicating with said opening.

5. The combination of a panel board carrying switches and the like, standards supporting said panel board, brackets extending from said standards, a second panel board carried by said brackets, a panel board in a plane behind the first mentioned panel board but out of registry therewith, a vapor electric device carried by the last mentioned panel board, a protecting cage for said vapor electric device, and a removable cover for said cage.

6. The combination of a panel board carrying switches and the like, a second panel board, a vapor electric device pivotally mounted on the second panel board, an operating handle on the first panel board, and a system of mechanical connections between said operating handle and said vapor electric device for tilting the latter about its pivot.

7. The combination of a vapor electric device, a pivoted support therefor, a protecting inclosure for said device, an accessible operating handle located outside of said protecting inclosure, and articulated connections between said vapor electric device and said operating handle whereby motion transmitted from said handle serves to rock or tilt said vapor electric device on its support.

8. The combination of a vapor electric device, a pivoted support therefor, a protecting inclosure for said device, an accessible operating handle located outside of said protecting inclosure, and articulated connections, one at least of which is of good insulating material, between said vapor electric device and said operating handle, whereby said handle is insulated from said device and whereby motion transmitted from said handle serves to rock or tilt said vapor electric device.

In witness whereof, I have hereunto set my hand this fifteenth day of September, 1905.

SAMUEL FERGUSON.

Witnesses:
G. C. HOLLISTER,
HELEN ORFORD.